Figure 1:
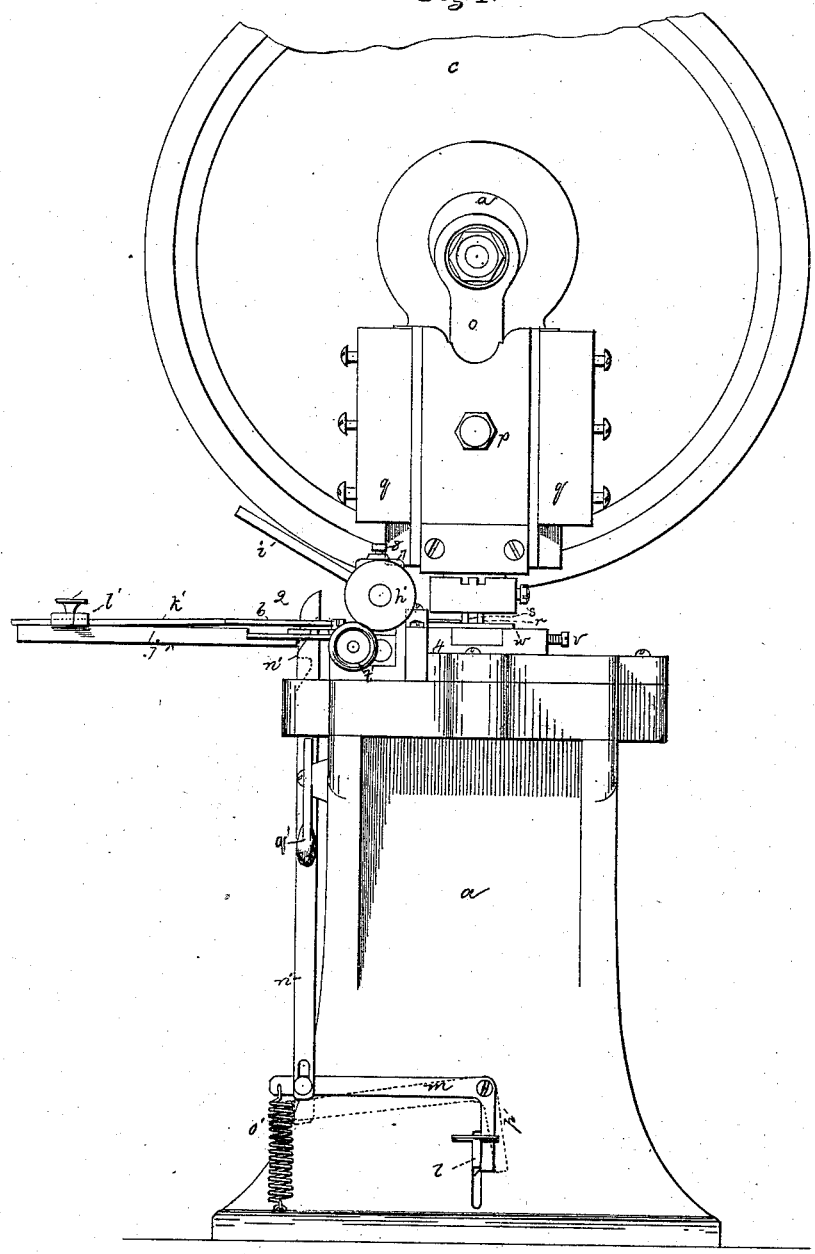

R. E. CADY.
MACHINE FOR MAKING HORSESHOE NAILS.

No. 187,808. Patented Feb. 27, 1877.

Witnesses.
Inventor
Ransom E. Cady

3 Sheets—Sheet 2.
R. E. CADY.
MACHINE FOR MAKING HORSESHOE NAILS.
No. 187,808.  Patented Feb. 27, 1877.
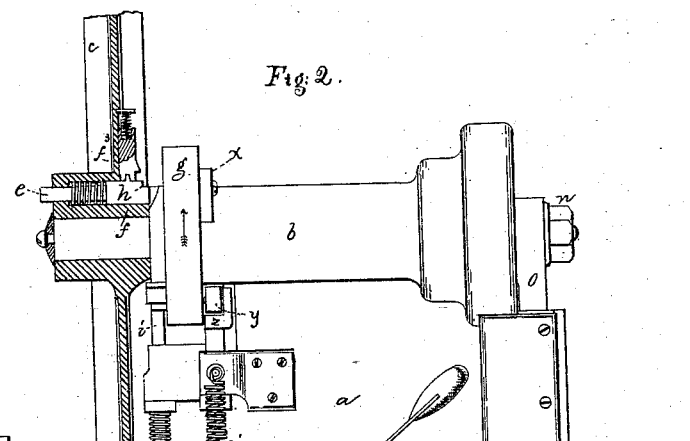
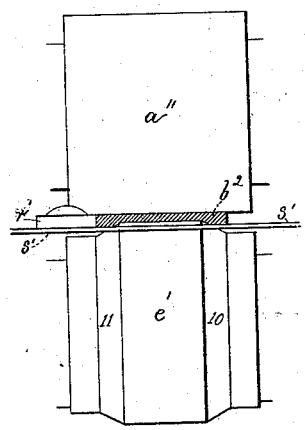
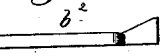
Witnesses-
L. H. Latimer.
W. J. Pratt.
Inventor
Ransom E. Cady.
per Crosby & Gregory
attys.

3 Sheets—Sheet 3

R. E. CADY.
MACHINE FOR MAKING HORSESHOE NAILS.

No. 187,808. Patented Feb. 27, 1877.

Witnesses.

Inventor
Ransom E. Cady
per Crosby & Gregory
atty.

UNITED STATES PATENT OFFICE.

RANSOM E. CADY, OF BOSTON, MASS., ASSIGNOR TO GLOBE NAIL COMPANY.

IMPROVEMENT IN MACHINES FOR MAKING HORSESHOE-NAILS.

Specification forming part of Letters Patent No. 187,808, dated February 27, 1877; application filed June 3, 1876.

*To all whom it may concern:*

Be it known that I, RANSOM E. CADY, of Boston, in the county of Suffolk and State of Massachusetts, have invented an Improved Machine for the Manufacture of Horse-Nails, of which the following is a specification:

This invention has reference to a machine for the manufacture of nails for horse or other animal shoes, and relates specially to a combination of mechanism adapted to feed and guide to the action of cutters a nail-strip made as a long bar, and provided at each edge with a head-forming rib, the strip being fed to the cutting-out punches and dies by means of rollers adapted to fit the flat and grooved sides of the strip. These rollers deliver the bar at proper speed to the punches to correspond with the size of the nail. Adjustable gages at front and back of the feeding-rollers keep the edge of the strip in proper line with the punches and dies, and a strip-holder connected with the end of the strip enables the strip to be fed beyond the bite of the rollers, and when the strip is cut to the end a finger on the strip-holder operates the shipper and stops the machine. The plate shaped as shown and described in this machine, and from which the nails are to be cut, may be made of any brand of iron from which it is common to form horseshoe-nails; but I prefer to, and do, use iron made by the Siemens process, or that known as "homogeneous iron." This iron is reduced by rolls to bars having a trough-like cross-section, as shown in the drawings, and of indefinite length, and of a width equal to the length of the nail-blank to be cut therefrom, plus the length of the head of the blank.

Figure 4:
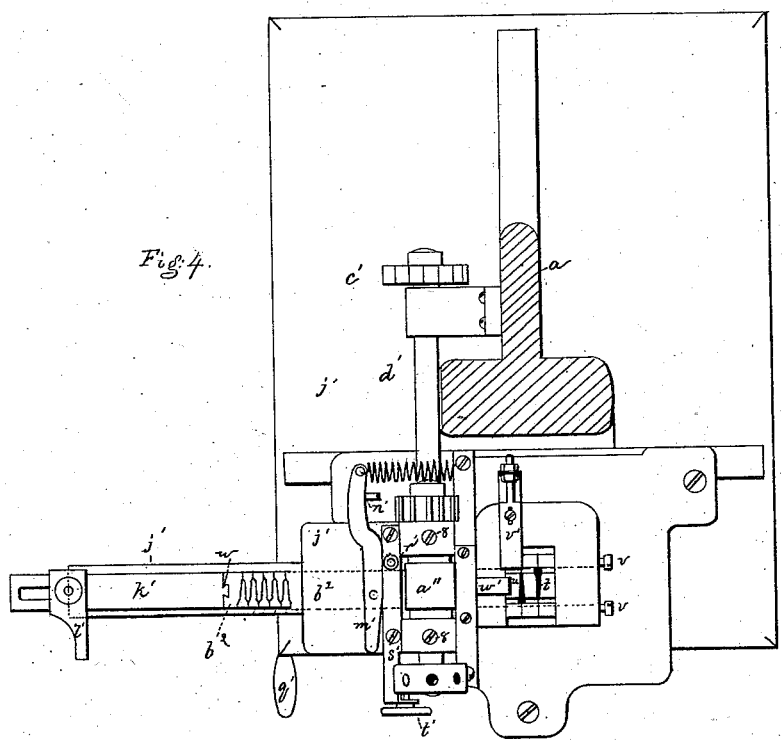
Figure 6:
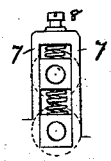

Figure 1 represents the improved machine in front view; Fig. 2, a side view; Fig. 3, an enlarged side view of rollers, showing a nail-strip between them; Fig. 4, a top view of the feed and dies, the upper portion of the machine being broken away; and Fig. 5, an enlarged cross-section of strip; Fig. 6, an end view of the feeding-rollers.

The frame for supporting the working parts is made of any proper shape. The main shaft, mounted, in this instance, in a tubular sleeve-bearing, $b$, is driven from a driving-pulley, $c$, having a clutch consisting of a spring-bolt, $e$, carried by the hub $f$, and adapted to engage a notch in a collar, $g$, on the main shaft. The spring-bolt is provided at its end with an inclined shoulder, $h$, against which may strike a shoe on the end of an unclutching-bar, $i$, when the bar is elevated by the spring $j$. This bar $i$ is connected, by link $k$, with a foot-lever, $l$, which, when held down by lever $m$, Fig. 1, prevents the shoe on bar $i$ from striking the bolt and unclutching the pulley; but when the lever $l$ is released, the spring $j$ elevates the rod, and the shoe pushes back the bolt, and permits the pulley to run free on the shaft of the machine. A spring-catch, $f^3$, (shown in Fig. 2, and carried by the pulley $c$,) engages and holds the bolt $e$ back, when the latter is thrown backward by the shoe on the unclutching-bar. At its front end the driving-shaft is provided with an eccentric or crank-pin, $n$, connected, by link $o$, with the punch-carrier $p$, adapted to reciprocate in adjustable guides $q$, and provided at its lower end with removable punches $r\ s$, adapted to enter dies $t\ u$, formed in removable die-blocks held securely on the bed 4 by set-screws $v$, the dies being arranged, with their head and point-forming openings, as shown, the punches matching exactly with, and driving, the nails cut from the strip $b^2$ down through the die-openings. The strip shown in Fig. 4 is enlarged and shown in section in Fig. 3, and in Fig. 4 the top of the strip is marked off on the lines at which it will be cut to form nails. The hub $g$, or other moving part of the main shaft, has a cam, $x$, adapted to strike a roller, $y$, on a pawl-carrying rod, $z$, provided with a spring, $a'$, to keep it up against the cam and hub, and a pawl, $b^1$, hinged at the lower end of the pawl-carrier engages the ratchet $c'$ on the shaft $d'$ of the lower feed-roller $e'$. A spring presses the pawl toward the ratchet-teeth; but it may be pressed back away from the ratchet by a hand-lever, $f^1$, when it is desired for any purpose to reverse or move the feed-rollers by hand, the upper feed-roller $a''$ for this purpose being provided at one end with a cylinder, $h'$, in which are holes adapted to receive a hand-lever or pin, $i^1$, the lower feed-roller moving with it through the action of the connecting-pinions 5 6. The shaft of the feed-roller $a''$ is supported on plummer-boxes held down between standards 7 by springs (see Fig. 6) controlled, as to pressure, by set-screws 8. A supporting-plate, $j'$, is arranged in front of the feed-rollers, to support the strip $b^2$ and the strip-holder $k'$, provided with an adjustable finger or detaching-gage, $l'$. The forward end of the strip-holder has a dovetail or other proper shaped projection, $w$, to engage a corresponding notch in the end of the nail-strip. The strip-holder is of substantially the same width as the strip, thereby permitting the end of the nail-strip to pass beyond the nip of the feed-rollers. The latter, then acting on the strip-holder, enables the nail-strip to be moved forward, so as to be cut or used up quite to its end, thereby making a very considerable saving in metal. The finger $l'$ at the back end of the strip-holder meets the tripping-lever $m'$, when the nail-strip is moved far enough to permit the last nail to be cut, and it releases the catch-bar $n'$, held up by a spring, $o''$, and connected with lever $m$, which is pulled down by a spring, $o'$. The end $p'$ of this lever $m$ engages and holds the lever $l$ down so long as the catch-bar $n'$ is held up by the tripping-lever $m'$; but when the latter is moved by the finger $l'$, then the movement of lever $m$, acting through the lever $l$, as before described, stops the machine by disengaging the clutch on pulley $c$. This disengagement may be effected by means of the hand-lever $q'$. The back edge of the nail-strip is guided in front of the feed-rollers by means of a roller, $r'$, on a carriage, $s'$, adjustable laterally by a screw-shaft, $u'$, and crank or hand-wheel $t'$. At the opposite side of the rollers is placed an adjustable gage, $v'$, these two gages keeping the nail-strip in proper line with relation to the punches and dies. The end of the strip is held down firmly by a presser, $w'$, quite up to the first punch, and this retains the strip in position after it passes the feed-rollers, and prevents it from being lifted by the punch and disengaged from the holder, and nails are cut quite up to the holder. Fig. 3 shows the construction of the feed-rollers. The upper one, $a''$, is made cylindrical, to bear against the straight side of the nail-strip $b^2$, and hold it down against the lower roller $e'$, which is shaped to fit the trough-like or depressed side of the nail-strip. This roller, it will be noticed, is fitted to bear against the flat or central portions of the nail-strip at both its sides, and the head-forming portions of the strip will preferably bear on the edges 10 11 of the feed-roller, and keep the strip for its whole width pressed between both rollers. If the lower roller $e'$ was of the same length as the upper roller $a''$, as usual, then the strip would not be moved as positively and accurately, for the plain roller could only act on the ribs or thickened edges of the strip. The use of a strip of the material described enables the production of a very superior quality of nail, and the strip, made long and manipulated as described, enables the production of a given quantity of horse-nails with less waste than when using short strips cut from rolled plates with transverse ribs. The punches and dies act to form two blanks at each descent of the carrier $p$, and the blanks are subsequently drawn cold and bevel-pointed and sheared, in the usual manner.

I claim—

1. The combination, with the feeding-rollers, of a strip-holder adapted to move with the nail-strip, and between the acting faces of the feeding-rollers, to present the rear end of the strip to the action of the punch and die, substantially as described.

2. The strip-holder and its detaching-gage, in combination with the tripping-lever, and with connected devices to stop the machine when the end of the nail-strip reaches the punch and die, substantially as described.

3. The tripping-lever $m'$, rod $n'$, levers $m$ and $l$, and connected unclutching-bar $i$, provided with a shoe, and adapted to operate the bolt $e$ and disengage the pulley, substantially as set forth.

4. In a machine for making horse-nails, the feeding-rollers and punch and die, in combination with the adjustable gages $r\ v'$, arranged and adapted to operate as described.

In testimony whereof I have signed my name to this specification in the presence of two subscribing witnesses.

RANSOM E. CADY.

Witnesses:
G. W. GREGORY,
L. H. LATIMER.